United States Patent [19]
Reinartz et al.

[11] Patent Number: 5,251,971
[45] Date of Patent: Oct. 12, 1993

[54] ANTI-LOCK CONTROLLED BRAKE SYSTEM FOR AUTOMOTIVE VEHICLES

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 849,051

[22] PCT Filed: Aug. 3, 1992

[86] PCT No.: PCT/EP91/01467
§ 371 Date: Apr. 23, 1992
§ 102(e) Date: Apr. 23, 1992

[87] PCT Pub. No.: WO92/03317
PCT Pub. Date: Mar. 5, 1992

[30] Foreign Application Priority Data
Aug. 24, 1990 [DE] Fed. Rep. of Germany ....... 4026743

[51] Int. Cl.$^5$ .......................... B60T 8/40; B60T 8/42; B60T 8/44
[52] U.S. Cl. ............................ 303/115.4; 303/116.1; 303/119.1; 303/900
[58] Field of Search .................. 303/115 PP, 115 FM, 303/116 R, 116 SP, 116 PC, 10-12, 100, 113 R, 113 TR, 113 AP, 115 R, 115 VM, 119 R, 119 SV, DIG. 5, DIG. 6, 115.4, 115.5, 116.1, 116.2, 116.3, 116.4, 119.1, 900, 901, 113.1-113.5

[56] References Cited

U.S. PATENT DOCUMENTS

| | | | |
|---|---|---|---|
| 4,618,189 | 10/1986 | Nakanishi et al. | 303/115 PP |
| 4,699,435 | 10/1987 | Wupper | 303/11 |
| 5,094,511 | 3/1992 | Becker et al. | 303/119 R X |
| 5,152,586 | 10/1992 | Burgdorf | 303/115 PP X |

FOREIGN PATENT DOCUMENTS

| | | |
|---|---|---|
| 3037460 | 5/1982 | Fed. Rep. of Germany. |
| 3505410 | 8/1986 | Fed. Rep. of Germany. |
| 3844126 | 7/1989 | Fed. Rep. of Germany. |
| 3834539 | 4/1990 | Fed. Rep. of Germany. |
| 4004316 | 2/1991 | Fed. Rep. of Germany. |
| 3936850 | 5/1991 | Fed. Rep. of Germany. |
| 2635305 | 2/1990 | France. |
| 60-236859 | 11/1985 | Japan. |
| 60-248467 | 12/1985 | Japan. |

OTHER PUBLICATIONS

Japanese Abstract, vol. 10, No. 105 (M-471) (2162) Apr. 19, 1986.
Japanese Abstract, vol. 10, No. 118 (M-475) (2175) May 2, 1986.

*Primary Examiner*—Douglas C. Butler
*Attorney, Agent, or Firm*—Robert P. Seitter; J. Gordon Lewis

[57] ABSTRACT

An anti-lock-controlled brake system for automotive vehicles is described, with a braking pressure generator (6), connected via a main pressure line (5) to a wheel brake (1) with an auxiliary hydraulic pressure pump (2) connected to an auxiliary pressure line (12), and a pressure medium accumulator (19) connected to a pressure limiting valve (3) control-lable in dependence on the hydraulic pressure of the wheel brake (1). A control of the accumulator pressure and volume within a closed hydraulic system is thereby provided which will take place in dependence on the wheel brake pressure to be in conformity with actual requirements.

9 Claims, 2 Drawing Sheets

ANTI-LOCK CONTROLLED BRAKE SYSTEM FOR AUTOMOTIVE VEHICLES

BACKGROUND OF THE INVENTION

This invention relates to an anti-lock-controlled brake system for automotive vehicles.

Such a brake system is already known from patent application, official Ser. No. P 40 15 884.5. If, within the scope of an anti-lock control operation, in this brake system, the braking pressure or rather the volume in the wheel brake threatened by a lock-up is reduced by means of actuating the inlet and outlet valves the electronic control unit simultaneously will cause the auxiliary pressure pump to start in order to provide the auxiliary pressure. The auxiliary pressure will switch a locking valve into its locking position so that the braking pressure generator will be separated from the pump pressure prevailing in the main pressure line. Due to the pressure limiting valve preadjusted via a compression spring as well as because of the hydraulic connection of the pressure limiting valve with the wheel brake on the front axle and because of the hydraulic communication towards the auxiliary pressure pump the pump pressure will automatically regulate itself in dependence on the wheel brake pressure active at the pressure limiting valve as well as in dependence on the spring-force-adjusted hydraulic prepressure. Consequently, the pressure limiting valve will adjust the pump pressure to the respective wheel brake pressure plus the adjusted prepressure of the effective compression spring. Thus, in case of need, on the one hand, pressure build-up of the auxiliary pressure pump can take place at a quicker rate as, due to the inventive hydraulic operating position, a relatively smaller pressure has to be overcome. On the other hand, the noise emission of the inlet valve is markedly reduced as the pressure difference at the inlet valve cannot be higher than the compression-spring-generated prepressure of the pressure limiting valve.

As compared with the generic brake system, this invention has the advantage that the return line is no longer connected to the open storage reservoir but rather communicates with the master cylinder whereby an accumulator system connected to the auxiliary pressure pump is controlled in an economically reasonable manner in dependence on the actual wheel brake volume requirements or rather on the actually required wheel brake pressure.

It is thus an object of this invention to further develop an anti-lock-controlled brake system of the type referred to at the beginning such as to enable a brake-slip-dependent adaptation of the auxiliary pressure supply to the actual pressure medium requirements in the wheel brake in a brake system decoupled from the storage reservoir.

SUMMARY OF THE INVENTION

According to this invention this object is solved by controlling the accumulator pressure or rather the volume of a closed hydraulic system via a pressure medium accumulator, connected to the pressure limiting valve, in dependence on the wheel brake pressure so as to meet the actual requirements.

The pressure medium accumulator is preferably formed by connecting two pressure accumulator pistons in tandem both in terms of construction and of action, the two pistons facing each other with a common space therebetween. Via the operation of the pressure limiting valve, this will cause an indirect hydraulic effect of the pressure level, adjusted at the wheel brake, on the pressure accumulator and this, on its part, will cause the second pressure accumulator piston to perform a stroke movement independent of the first pressure accumulator piston movement.

A spring element is interposed between the two facing pressure accumulator pistons in order to effect a spring-characteristic-dependent sequential control of the second pressure accumulator piston acting as a high pressure accumulator section.

A structurally compact and, hence, integral combination of the two pressure accumulator pistons with the spring element is achieved by mounting in a common pressure accumulator housing.

A non-return valve, locking in the direction of the auxiliary pressure pump, and a throttle are arranged in the hydraulic pressure medium connection line connecting the first pressure accumulator piston with the auxiliary pressure line. The non return valve prevents pressure medium from flowing back to the high-pressure side, and the throttle dampens pressurization of the first pressure accumulator piston.

The second pressure accumulator piston is directly hydraulically connected to the auxiliary pressure line, and will take over the function of the high-pressure accumulator, while the first pressure accumulator piston, indirectly controlled by the hydraulic pressure of the pressure limiting valve, will perform the functions both of a low-pressure accumulator piston and of a high-pressure precontrol piston.

DETAILED DESCRIPTION

Figure 1:
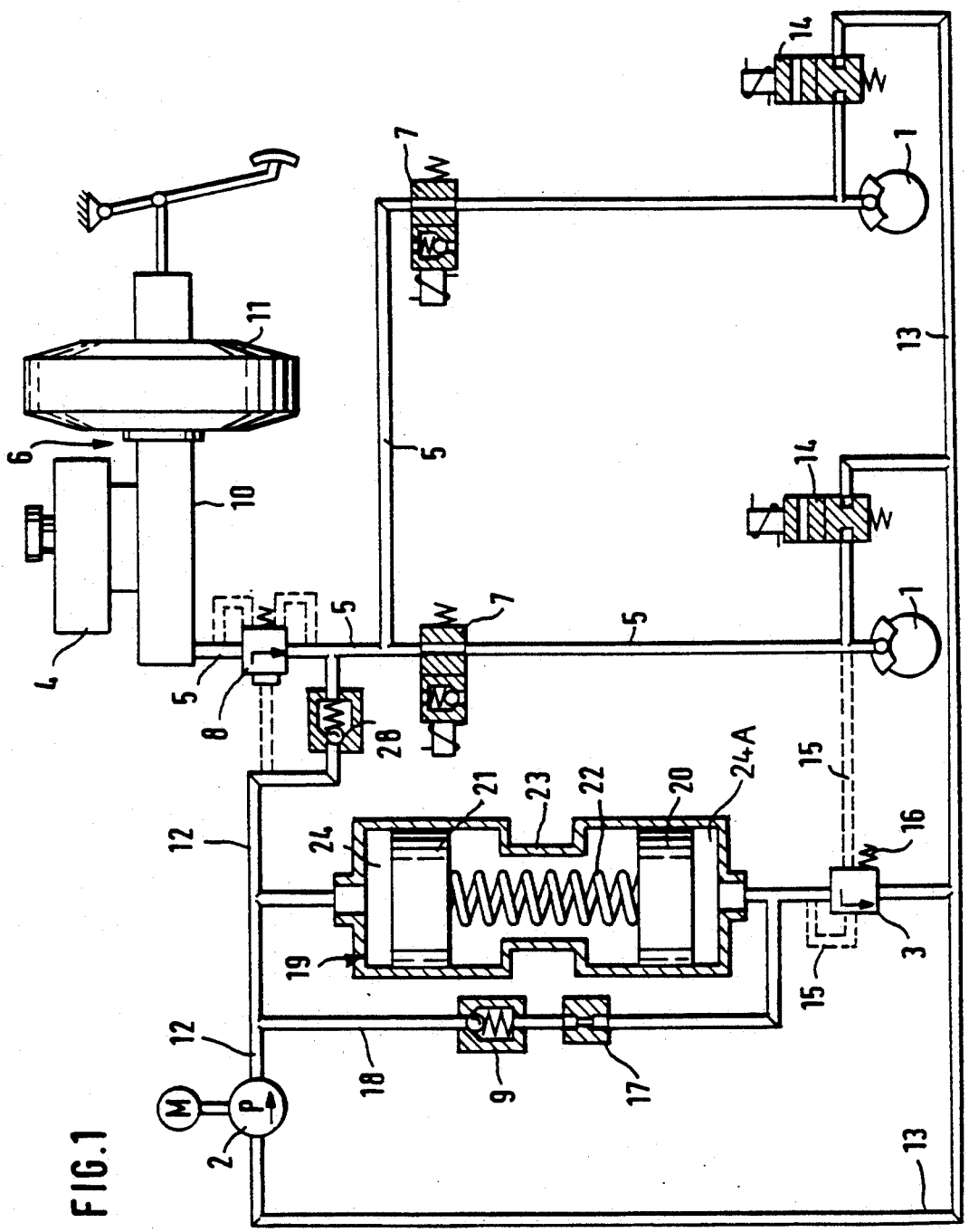
FIG. 1 is a schematic representation of the brake system according to the present invention.

FIG. 1 shows the basic hydraulic circuitry of the inventive anti-lock-controlled brake system with diagonal brake circuit allocation. For the sake of a clearer view, only one of the two brake circuit diagonals is shown and explained.

This brake system in accordance with the drawing consists of a braking pressure generator 6 establishing a hydraulic connection to the diagonally allocated wheel brakes 1 via branched main pressure lines 5. The braking pressure generator 6 has a tandem master cylinder 10 and a vacuum booster 11, the storage reservoir 4 featuring a conventional type of direct fastening to the tandem master cylinder 10. Arranged in the main pressure line 5, there are a locking valve 8 associated with the braking pressure generator 6 and the inlet valve 7 associated with the wheel brake 1 of the front axle. The inlet valve 7 as per the drawing is electromagnetically actuatable. In the branch between the locking valve 8 and the inlet valve 7, there follow the main pressure line 5, associated with the second diagonal wheel brake 1 and likewise provided with an inlet valve 7, as well as an auxiliary pressure line 12 connecting the auxiliary pressure pump 2 with the main pressure line 5.

Between each of the wheel brakes 1 and inlet valves 7, is a respective electromagnetically controllable outlet valve 14 controlling communication with a return line 13 connecting the diagonal wheel brakes 1 with the storage reservoir 4. Further, the return line 13 communicates with the suction line of the auxiliary pressure pump 2 as well as with a hydraulic port of the pressure limiting valve means 3. Via the control pressure lines 15, branched off from the auxiliary pressure line 12 and from the main pressure line 5, the pressure limiting valve 3 is connected with the auxiliary pressure pump 2 on the one hand, and with the wheel brake 1 of the front axle, on the other hand.

Due to the arrangement of a compression spring 16 acting on the pressure limiting valve means 3, a pre-stressing force is effective to generate the desired hydraulic prepressure. Pressure medium connection line 18 connected in parallel to the return line 13, extends between the auxiliary pressure line 12 and the hydraulically controllable pressure limiting valve 3. A nonreturn valve 9, locking in the direction of the auxiliary pressure pump 2 and communicating with the pressure limiting valve 3 via a throttle 17 connected in series downstream, is arranged in branch line 18. Further, branched off from the auxiliary pressure line 12 and from the pressure medium connection line 18, there is arranged a pressure medium accumulator means 19 provided with two pressure accumulator pistons 20, 21. The accumulator piston 20, 21 are arranged in tandem facing each other and indirectly engaging each other via a spring 22 interposed between them.

The first pressure accumulator piston 20 defines a first expansible chamber 24A, which is subjected to the adjusted pressure immediately upstream of the pressure limiting valve means 3 while the second pressure accumulator piston 21 defines a second expansible chamber 24 which is expansible against the predetermined force exerted by the spring 22 on the second piston 21 under the action of the pressure of the auxiliary pressure line 12.

MODE OF OPERATION

The valve operating positions as shown in the drawing in general apply to the brake-released position as well as to the condition during the slip-free normal position of the brake.

In the slip-free operating position of the brake, the actuation of the braking pressure generator 6 will cause a pressure proportional to the foot pressure to be built up in the main pressure line 5 and the wheel brakes 1 via the locking valve 8 open in the basic position and via the inlet valves 7. The outlet valves 14 and the non-return valves 9 associated with the wheel brakes 1 will remain closed in their basic positions while the pressure in the main pressure line 5 and in the hydraulic control pressure line 15, connected thereto, acts on the pressure limiting valve means 3 in a manner balancing the action of the compression spring 16. The control pressure line 15 connecting the pressure limiting valve means 3 with the auxiliary pressure line 12 will remain pressureless for the time being due to the non-return valve 9, locking in the direction of the inactive auxiliary pressure pump 2.

As soon as, due to low road friction values, brake slip signals inform an electronic slip control unit that a vehicle wheel is overbraked, the braking pressure, or rather the volume, will be reduced in the threatened wheel brake 1 within the scope of anti-lock control. This will be done in that an electric signal of the electronic control unit will open the outlet valve 14, the associated inlet valve 7 becoming closed. At the same time, the electronic control unit will start the auxiliary pressure pump 2 so as to provide the auxiliary pressure. The auxiliary pressure will switch the locking valve 8 into its locking position so that the braking pressure generator 6 will be separated from the pump pressure prevailing in the main pressure line 5. Due to the pressure limiting valve means 3 preadjusted via the compression spring 16 as well as because of the hydraulic connection of the pressure limiting valve means 3 with the wheel brake 1 on the front axle and due to the hydraulic communication of the pressure limiting valve means 3 with the auxiliary pressure pump 2, the accumulator pressure will automatically regulate itself in dependence on the wheel brake pressure, adjusted at the pressure limiting valve means 3 and thus indirectly acting back on the pressure medium accumulator means 19 by the effect on the first piston 20 and spring 22. The accumulator pressure is consequently adjustable to the respective prevailing wheel brake pressure by means of the pressure medium accumulator 19 connected to the pressure limiting valve 3. In the example of an embodiment shown, the pressure medium volume discharged from the wheel brake 1 into the return line 13 will be sucked in by the auxiliary pressure pump 2 and, as the pressure increases, supplied to the pressure medium accumulator second chamber 24 connected to the auxiliary pressure line 12. In doing so, the wheel brake pressure of the front axle acting on the pressure limiting valve 3 will, by the effect of opening or closing of the pressure limiting valve means 3 on the pressure in first chamber 24A, determine the effective volume and pressure of the pressure medium accumulator means 19.

If, due to low friction values between the vehicle wheel and the road, the pressure level in the wheel brake 1 is relatively low, the pressure of the auxiliary pressure pump 2 will switch over the pressure limiting valve means 3 into the open position so that pressure medium can flow from the delivery side of the auxiliary pressure pump 2 to the return line 13 via the non-return valve 9 and the throttle 17. Thus, simultaneously, the first pressure accumulator piston 20 located near the pressure limiting valve means 3 and acting as a low-pressure accumulator will experience a pressure relief whereby, due to the diminished force of the interconnected spring element 22 acting on the second pressure accumulator piston 21, having directly applied pump pressure exerted thereon and acting as a high-pressure accumulator piston, will carry out a stroke movement which will increase the accumulator volume and thus relieve the accumulator pressure.

In contrast thereto, in case of a relatively high pressure level in wheel brake 1 and, hence, in case of high-friction value operation, the pressure limiting valve means 3 will keep the hydraulic connection between the return line 13 and the auxiliary pressure line 12 closed so that, by means of the pump pressure acting on the first pressure accumulator piston 20, the spring element 22 acting on the second pressure accumulator piston 21 will be compressed, thereby the accumulator pressure level going up.

There will thus be ensured an adaptation of the pressure medium accumulator means 19 to the respective prevailing braking pressure control requirements which is desirable both economically and in terms of control technology. Moreover, a compact pressure medium accumulator is provided which, by means of the braking-pressure-adaptive accumulator pressure control, will reduce any operating noises of the brake system.

Figure 2:
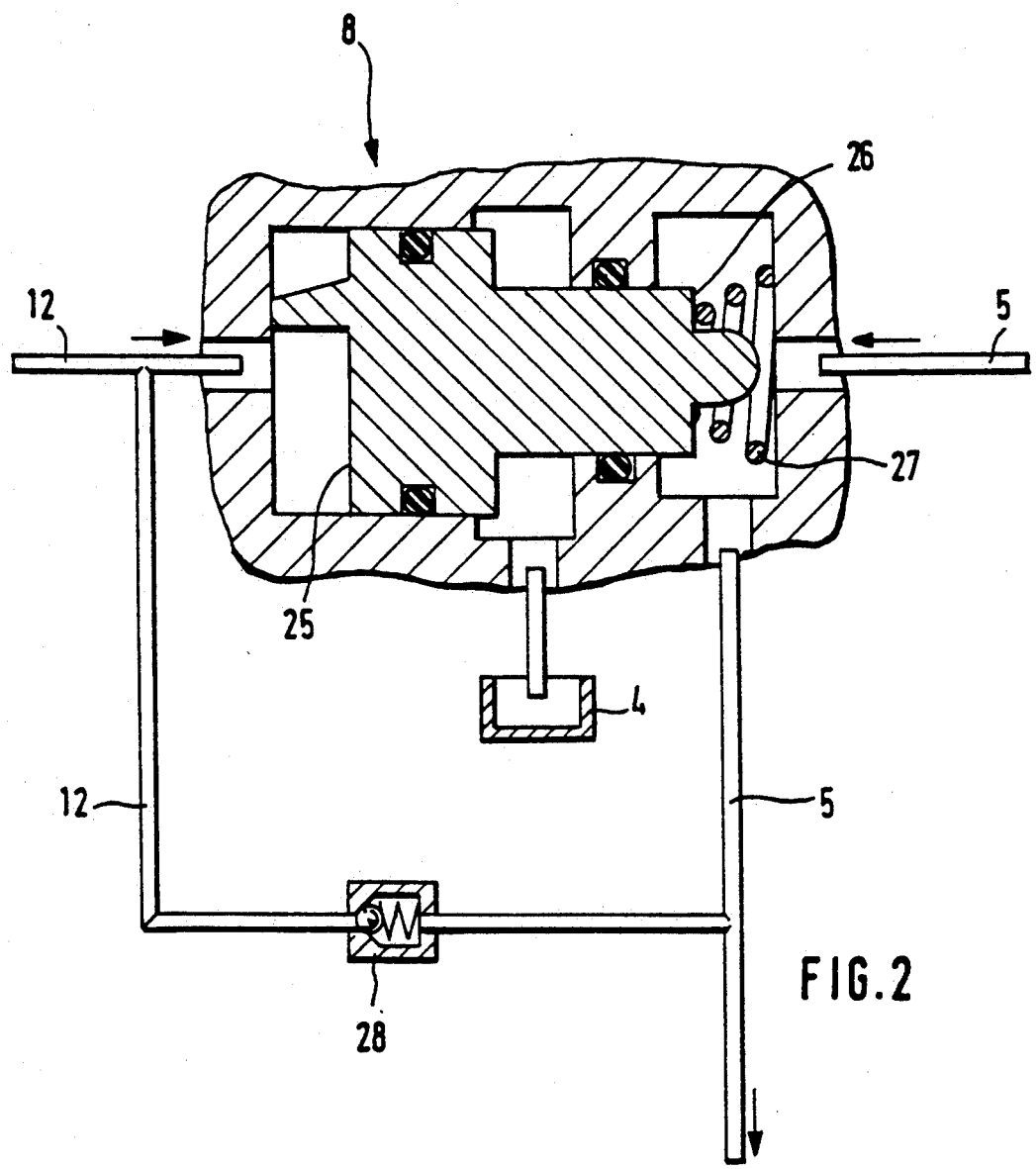
FIG. 2 is a detailed enlarged sectional view of the locking valve incorporated in the system of FIG. 1.

By way of an example, FIG. 2 shows a particular embodiment of the locking valve 8 in the open position, in accordance with which the front face of the larger piston stage 25 is subjected to the pressure of the auxiliary pressure pump 2 and the pressure medium accumulator means 19. The hydraulic communication between the tandem master cylinder 10 and the wheel brake circuit is controlled at the opposite smaller piston stage 26. Simultaneously, a non-return valve 28, is arranged parallel to the auxiliary pressure line 12 and to the main pressure line 5 and locking in the direction of the auxiliary pressure line 12, and will prevent the controlled pressure medium of the brake circuit, from flowing back in the direction of the auxiliary pressure line 12.

The smaller piston stage 26 is preferably designed as a seat valve on the valve, shoulder on which a compression spring 27 is held. The compression spring 27 is seated on the opposite housing wall of the locking valve 8, whereby the stop, formed on the large piston stage 25, touches the housing wall. As soon as the auxiliary pressure system is activated within the scope of anti-lock control, the auxiliary pressure will act on the large piston stage 25 and displace the stepped piston into the blocking position of the seat valve.

Consequently, the tandem master cylinder 10 will be isolated, from the connected main pressure line while pressure medium may flow from the auxiliary pressure line 12 to the main pressure line 5 via the non-return valve 28 Thus, by functioning as a pressure governor, the locking valve 8 arranged in the main pressure line 5 will ensure the maintenance of a defined pressure relationship between the tandem master cylinder 10 and the auxiliary pressure pump 2 during an anti-lock control operation. The locking valve 8 will remain closed as long as there is no lack in volume in the associated wheel brake circuits whereby, during the locking phase of the locking valve 8, there will result a smaller pressure level in the tandem master cylinder 10 than in the pressure medium accumulator 19.

We claim:

1. An anti-lock-controlled brake system for automotive vehicles with a pedal-operated braking pressure generator including a master cylinder, a wheel brake, at least one main pressure line, aid wheel brake being connected to said braking pressure generator by said main pressure line, an auxiliary hydraulic pressure pump having an inlet and an outlet, and an auxiliary pressure line connected to said pressure pump outlet and said main pressure line, a return line connecting said wheel brake to said inlet of said auxiliary hydraulic pressure pump, an electromagnetically actuatable inlet valve in said main pressure line, an electromagnetically controlled outlet valve in said return line, pressure limiting valve means, and means subjecting said pressure limiting valve means to the pressure of said auxiliary pressure pump in said auxiliary pressure line and to the pressure in said main pressure line acting on said wheel brake, and said pressure limiting valve means responsive to establish a hydraulic connection between said auxiliary pressure line and said return line when said pump pressure exceeds said wheel brake pressure by a predetermined amount, pressure medium accumulator means having an accumulator chamber expansible against a predetermined force and connected to said pressure pump outlet to be charged by expansion of said accumulator chamber by flow from said pressure pump, and, means varying said predetermined force in response to operation of said pressure limiting valve means for connecting said auxiliary pressure line to said return line whereby the pressure in said accumulator chamber is controlled in dependence on said hydraulic pressure at said wheel brake.

2. An anti-lock-controlled brake system as claimed in claim 1, wherein said pressure medium accumulator means includes first and second pressure accumulator pistons connected together in tandem, said second of said pistons defining said accumulator chamber.

3. An anti-lock-controlled brake system as claimed in claim 2, wherein a spring element is interposed between said first and second pressure accumulator pistons, said spring element generating said predetermined force acting against expansion of said accumulator chamber.

4. An anti-lock-controlled brake system as claimed in claim 3, further including pressure accumulator housing, and wherein said first and second pressure accumulator pistons, together with said spring element, are mounted in said pressure accumulator housing.

5. An anti-lock-controlled brake system as claimed in claim 1, further including a pressure medium connection line connected between said auxiliary pressure line and said return line with said pressure limiting valve means disposed therein, said pressure medium connection line having a non-return valve and a throttle therein.

6. An anti-lock-controlled brake system as claimed in claim 5, wherein said non-return valve acts so as to be blocking in the direction of said auxiliary pressure pump.

7. An anti-lock-controlled brake system as claimed in claim 2, wherein said second pressure accumulator piston has said pressure of the auxiliary pressure pump outlet directly exerted thereon.

8. An anti-lock-controlled brake system as claimed in claim 5, wherein said first pressure accumulator piston is subjected to the pressure in said pressure medium connection line prevailing upstream of said pressure limiting valve means.

9. An anti-lock-controlled brake system as claimed in claim 8, wherein said throttle is arranged between said non-return valve and said first pressure accumulator piston and directly connected to said pressure limiting valve means.

* * * * *